United States Patent [19]
Grinshpun et al.

[11] Patent Number: 5,973,018
[45] Date of Patent: Oct. 26, 1999

[54] PROCESS FOR PRODUCING SHAPED PHENOLIC FOAMS

[75] Inventors: Vyacheslav S. Grinshpun, Granville; Byron Jeffrey Hulls; William H. Fausey, both of Newark, all of Ohio

[73] Assignee: Owens-Corning Fiberglas Technology, Inc., Summit, Ill.

[21] Appl. No.: 08/538,898

[22] Filed: Oct. 4, 1995

[51] Int. Cl.$^6$ ........................................................ C08J 9/36
[52] U.S. Cl. ........................... 521/181; 156/78; 156/187; 156/307.1; 521/918
[58] Field of Search ................................... 521/181, 918; 156/78, 187, 307.1

[56] References Cited

U.S. PATENT DOCUMENTS

| | | | |
|---|---|---|---|
| 4,900,759 | 2/1990 | Clark et al. | 521/98 |
| 5,057,546 | 10/1991 | Sudan | 521/107 |
| 5,114,773 | 5/1992 | Bogdany | 521/54 |
| 5,166,184 | 11/1992 | Hashimote et al. | 521/135 |
| 5,182,310 | 1/1993 | Skorpenske et al. | 521/116 |
| 5,234,969 | 8/1993 | Clark et al. | 521/181 |
| 5,292,464 | 3/1994 | Hanning et al. | 264/46.5 |
| 5,405,665 | 4/1995 | Shukushima et al. | 428/34.9 |
| 5,407,963 | 4/1995 | Willson et al. | 521/131 |

*Primary Examiner*—Morton Foelak
*Attorney, Agent, or Firm*—C. Michael Gegenheimer; Linda S. Evans; Curtis B. Brueske

[57] ABSTRACT

This invention is a partially or semi-cured foam used to form the pipe insulation. The semi-cured foam is very flexible and can be formed around a pipe for a long period of time after production. The semi-cured phenolic foam board of this invention is a closed cell foam. The semi-cured foam is further cured in the formed shape. Upon curing the foam retains the shape of the preform. The semi-cured product is very flexible, once fully cured, the insulation becomes rigid.

14 Claims, 3 Drawing Sheets

PROCESS FOR PRODUCING SHAPED PHENOLIC FOAMS

TECHNICAL FIELD

This invention relates to a process for producing shaped phenolic foams from semi-cured or partially cured foams. The shaped insulation typically is pipe insulation.

BACKGROUND OF THE INVENTION

Industry has produced semi-flexible or flexible phenolic foams having a substantially open cellular structure. The foams are the reaction product of a mixture of a phenol-aldehyde resin, a surfactant, a blowing agent; optionally a wetting agent and a catalyst. The method for producing a semi-flexible or flexible phenolic foam composition having a substantially opened cellular structure comprises mixing a phenol-aldehyde resin with a surfactant, a blowing agent and optionally a cell opening and wetting agent; curing the mixture by reacting it with an acid catalyst; compressing the cured or semi-cured product below its original thickness and releasing the pressure, thereby obtaining the desired semi-flexible or flexible phenolic foam composition.

U.S. Pat. No. 5,057,546 discloses such a semi-flexible or flexible phenolic foam composition. This foam composition is a substantially open cellular structure. Open cell phenolic foams have about half the R value of closed cell phenolic foams. The open cell foams are intended for conventional insulation uses, fluid absorption, sound absorption cushioning and the like. The open cell foams are not intended for pipe insulation.

Other prior art processes typically spray a liquid on the pipe which foams in place to produce foam insulation. The liquid systems are difficult to use and must be used on site immediately. For example, U.S. Pat. No. 5,292,464 discloses thermally insulating storage tanks or water heaters. The invention uses a jacket which forms a hollow insulation space where a liquid foam insulation is injected into the space. This is the conventional way of foaming in place. U.S. Pat. No. 5,405,665 shows another conventional foam in place pipe insulation. Multiple non-foam layers and foam layers are used. This pipe insulation is a multi-layer foam, heat shrinkable tube which also uses a hot melt adhesive. The use of hot melt adhesives presents another complicating step in production.

DISCLOSURE OF INVENTION

The process of this invention uses a partially or semi-cured foam to form the pipe insulation. The semi-cured foam is very flexible and can be formed around a pipe after a long period of time following production. The semi-cured phenolic foam board of this invention is a closed cell foam. The semi-cured product is very flexible, once fully cured, the insulation looses its flexibility.

The semi-cured, closed cell phenolic foam pipe insulation of this invention is unique. It provides flexibility which allows it to be easily wrapped around a round body such as a pipe, yet the foam has a higher thermal properties than open cell foams.

The semi-cured foam can be formed around a pipe for a long period of time after production. For example, we prepared several pieces of semi-cured phenolic boardstock, a month later, we wrapped a sample of the semi-cured foam produced around a 3' diameter pipe. The foam was then further cured. After curing, it retained its shape.

Higher quality foam materials can be produced by boardstock foam processes than could be produced by pour or spray in place processes. Also, we can use a low catalyst foam composition that would have less corrosivity in metal contact applications because of the control of cure time and temperature in the boardstock process.

BEST MODE OF CARRYING OUT INVENTION

Figure 1:
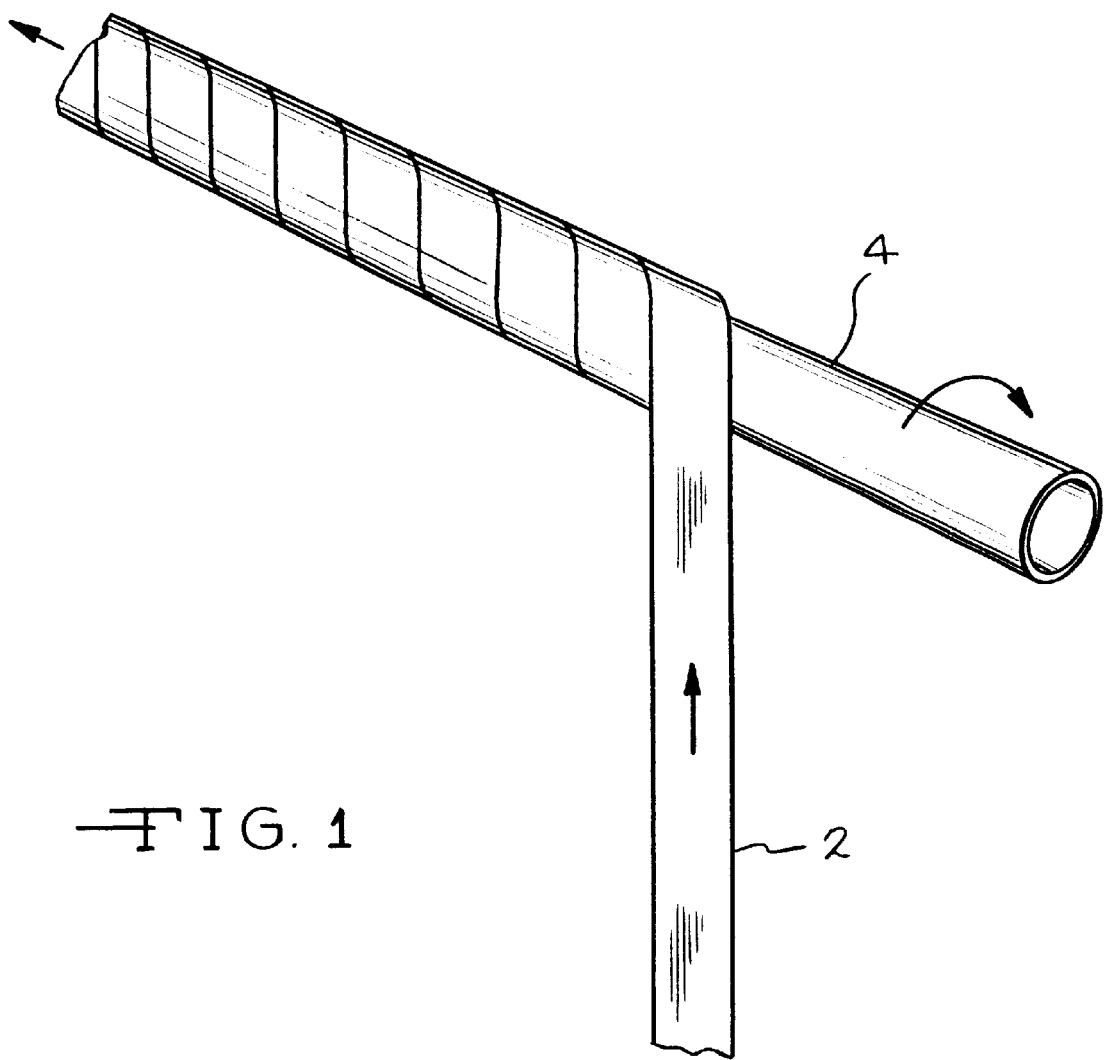
FIG. 1 shows semi-cured foam in a screw wrap design around a pipe.

We produce a phenolic foam board in the manner of U.S. Pat. No. 5,407,963. This sheet when produced maintains its physical dimensions, but it may still be bent or molded. The processing conditions for the foam are such that it is not fully cured during the boardstock process and the foam boardstock does not undergo a postcure cycle to achieve full cure. The boardstock is then formed around a pipe or sizing mandrel and the foam fully cured.

In one embodiment, we produce the foam board at double the required thickness and then it is slit into two pieces before being applied to the pipe. The carrier for the sheet forming process would be incorporated into the pipe insulation. If the foam sheet was slit and identical carriers were used on both sides of the foam sheet, a single sheet could form two faced pieces for insulation. If special barrier properties were required from a facer differing on the inside and outside of the pipe insulation, two differing facers could be used on the top and bottom of a single thickness foam sheet.

The processing conditions for the boardstock could be optimized for the performances of the material as a pipe insulation. The catalyst content of the foam and the temperature of the initial curing ovens would determine the degree of cure in the initial foam sheet, and thus its handlability, its ability to be post-foamed into a pipe insulation and its cell structure and insulation properties.

The processing includes the steps of:
providing a foaming composition of a resin, blowing agent, a surfactant and a catalyst;
mixing the composition to initiate foaming and to produce a resol foam; and
curing the foam to a density ranging from 0.5 to 3.0 pounds per cubic foot.

This process allows us to foam phenol formaldehyde resins which have a very high viscosity and cure the foams to a very low density. The resin is a phenol formaldehyde resol resin having substantially no free formaldehyde and having a water content of 4 to 8% and a viscosity ranging from 5,000 cps to 40,000 cps at 40° C.

The foams are prepared from resols which have been made using conventional starting mole ratios of phenol to formaldehyde, in the present case in the range of 1:1 to 1:4.5, preferably 1:1.5 to 1:2.5. The high mole ratio materials are the basis for resins which are substantially free of phenol and which can be treated with a formaldehyde co-reactant or scavenger, to reduce the initially high free formaldehyde content. The resin is concentrated to reduce the free water content of the resin. A typical viscosity resin used for manufacturing resol foam has a viscosity in the order of 5,000 to 40,000 cps and a free water content of 4 to 8%. However, during the manufacture of phenolic foams from high viscosity resins in accordance with the present invention, the resin utilized will preferably have a viscosity in the order of 5,000 to 20,000 cps at 40° C.

The blowing agent can be selected from a number of HCFCs or hydrofluorocarbons (HFCs). Specific examples of these blowing agents include 1-chloro-1,1-difluoroethane (142b), dichlorofluoro-methane (22), 2-chloro-1,1,1,2-tetrafluoroethane (124), 1,1-difluoroethane (152a), pentafluoroethane (125) and 1,1,1,2-tetrafluoroethane, dichlorflouro ethane (141b) or others.

The blowing agent also may include a perfluoroalkane wherein the perfluoroalkane comprises 1 to 5 weight percent of the total blowing agent weight. Preferably, the perfluoroalkane is represented by the formula:

$$C_nH_xF_y$$

wherein n is an integer ranging from 4 to 20, x is zero or an integer ranging from 2 to 10, and x+y=2n+2. Specific examples of the perfluoroalkane include dodecafluoropentane, tetradecafluorohexane, hexadecafluoroheptane.

Preferably the perfluoroalkane comprises 1 to 3 weight percent and more preferably, 1 to 2 weight percent of total blowing agent weight. Alkanes like butane, pentane or cyclopentane also could be employed. Surfactants which are generally used for phenolic foam manufacture are typically non-ionic in nature. Polyethylene-polypropylene oxide copolymer surfactants such as Pluronic (trademark of BASF Wyandotte) particularly the high molecular weight F-127, F-108 and F-98 and Harfoam PI (Huntsman Chemical Co.) are used. Surfactants containing silicon, such as the silicon ethylene oxide/propylene oxide copolymers of alkoxy silanes, polysilyl/phosphonates, polydimethylsiloxane and polyoxyalkylene copolymers can also be used. Examples of suitable commercial silicon-containing surfactants are the Dow Corning Trademarks DC-190 and DC-193 and the Union Carbide Trademarks L-530, L-5310 and L-5410.

Surfactant concentrations can vary from 2 to 10% of the total formulation weight. The preferred level for the resoles described herein is 2 to 5%. To produce closed cell foams which contain the blowing agent in sufficient amounts to give superior thermal values, careful selection of resin and surfactant properties is required.

The catalysts employed are usually acids. Under certain circumstances, foam may be generated solely by the application of heat without the use of a catalyst. In practice, however, a catalyst is necessary to complete the curing of the foams.

Numerous acid catalysts, both organic and inorganic, are known and disclosed in the prior art. Examples of inorganic acids include hydrochloric acids, sulfuric acids, nitric acid and the various phosphoric acids. Examples of organic acids include aromatic sulfuric acids, such as benzene sulfonic acid, toluene sulfonic acid, xylene sulfonic acid, phenol sulfonic acid and naphthalene sulphonic acid; latent acid catalysts such as phenol esters of carboxylic acids including phenyl trifluoroacetate and phenyl hydrogen maleate and various sulfur dioxide containing compounds such as the sulfur of a, β-unsaturated ketones and aldehydes and various dienes; mono and poly carboxylic acids such as acetic acid, formic acid, propionic acid, oxalic acid, maleic acid and strong substituted organic acids such as trichloracetic acid. An admixture of toluene sulphonic acids and xylene sulphonic acids is usually preferred. The acid catalyst sold under the trademark Ultra TX (Witco Chemical Company) is especially preferred.

The foam is encapsulated in a semi-permeable facer that acts as a carrier for the curing foam. The facer is incorporated into the final foam product. The facer could be a spun bond polyester matt, a glass mat, a reinforced or unreinforced tissue, felt, cloth, metal foil, plastic film or a combination of these.

The cured resol foam has a density ranging from 0.5 to 8.0 pounds per cubic foot. Preferably the resol foam density ranges from 0.7 to 1.8 pounds per cubic foot for use as in insulating material.

FIG. 1 shows semi-cured foam 2 in a screw wrap design around pipe 4. The wrapping of the foam boardstock around a rotating mandrel that is moving in the longitudinal axis at a rate that will produce an even covering of foam around the pipe. Foam 2 is then heated and cured in its formed position. The foam sheet is cut to width. Pipe 4 is rotated along its axis and moved transversely in its length direction. The foam width, pipe rotation speed and longitudinal speed are set so as to form a continuous covering on the pipe.

Figure 2:
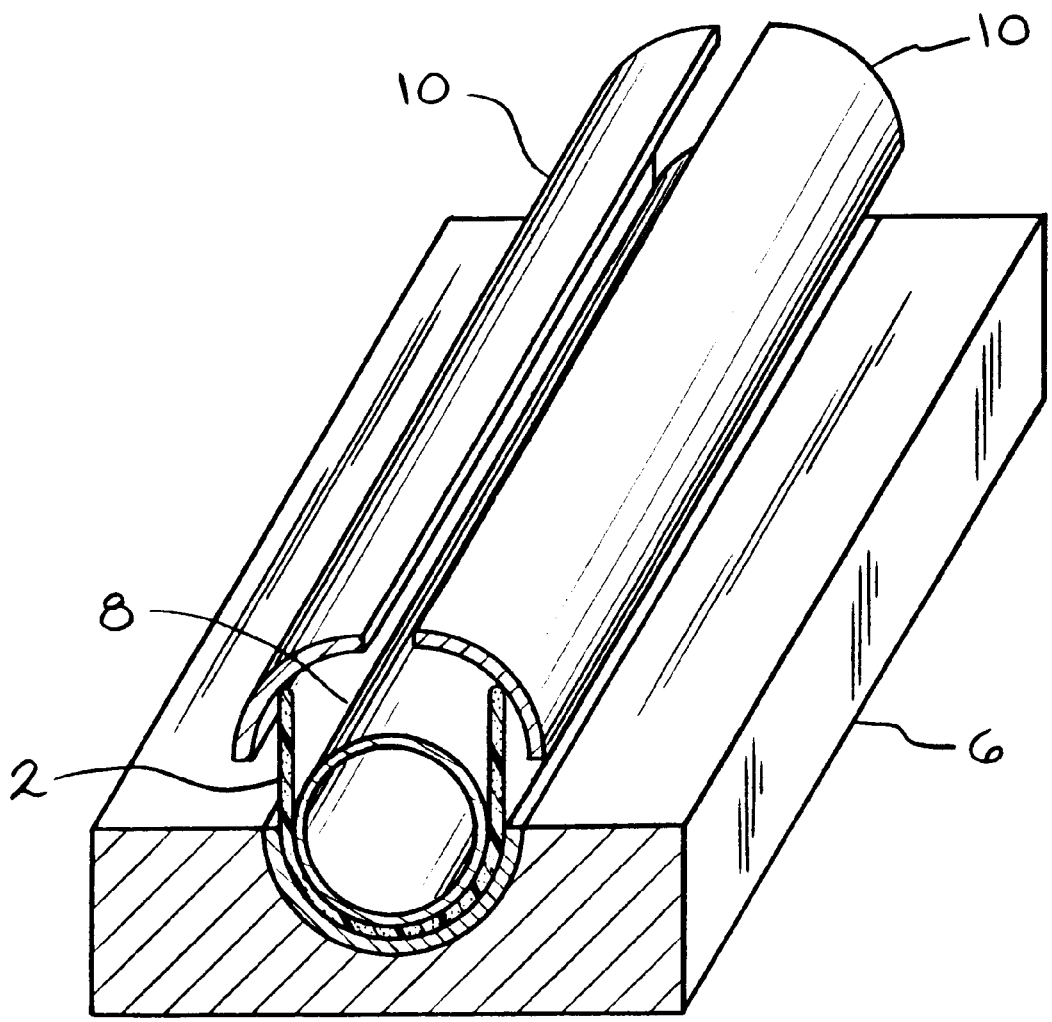
FIG. 2 shows pressure stamping semi-cured foam around a pipe.

FIG. 2 shows pressure stamping semi-cured foam 2 around pipe 4 or a removable mandrel. A section of boardstock is pressed around a mandrel or die and cured in position. The foam sheet is placed in lower mandrel block 6. Center sizing mandrel 8 is then placed onto the foam forming it to the shape of lower mandrel block 6. Top sizing blocks 10 are then moved to form foam 2 to the shape of center sizing mandrel 8. The molded parts are heated and foam 2 is removed from the mold by removal of top sizing blocks 10, removing pressure from center sizing mandrel 8 and ejecting the foam from lower mandrel block 6.

Figure 3:
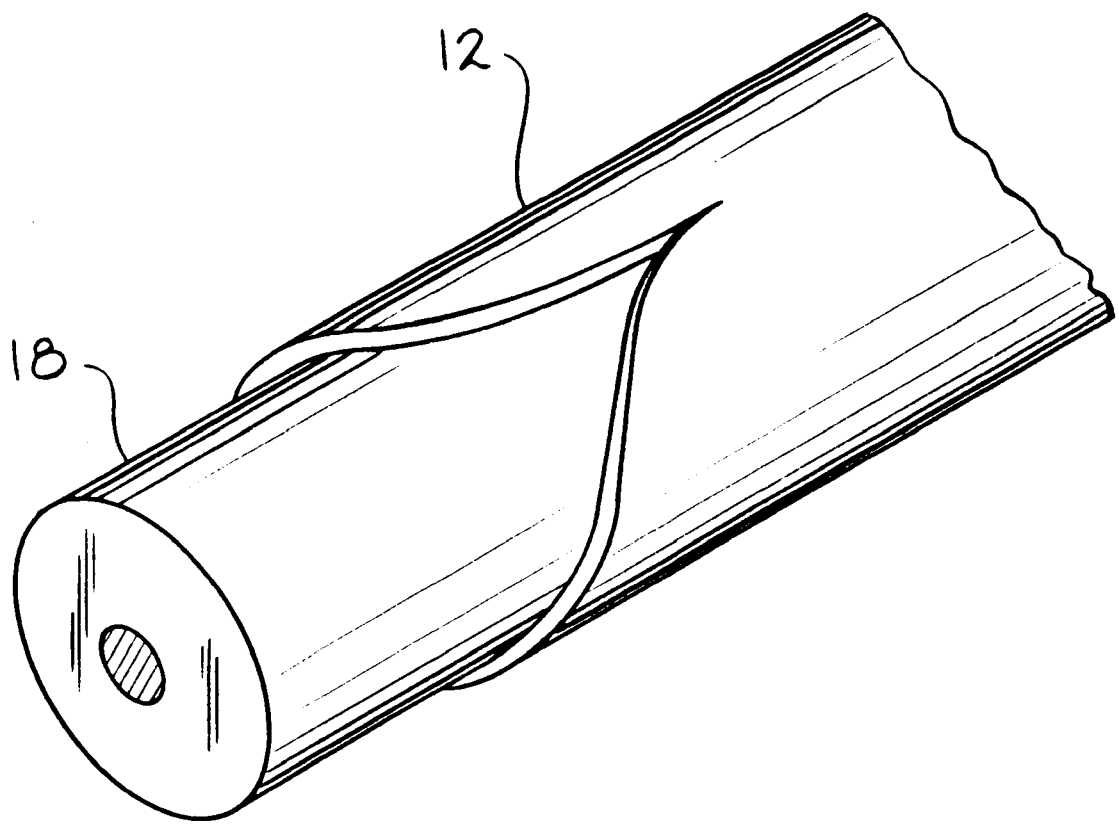
FIG. 3 shows semi-cured foam wrapped around a mandrel in a longitudinal direction.

FIG. 3 shows longitudinal forming semi-cured foam 12 around mandrel 18. Foam 12 is molded around mandrel 18 just after it has been formed. Foam 12 is then cured and removed from mandrel 18. In an alternative not shown, Foam 12 is moved into a forming shoe around an interior mandrel that is supported on one end. The foam from either alternative is then cured in an oven and then removed from the mandrel and sawn to length.

EXAMPLE 1

Preparation of Resol

The resol resin used in the production of these foams used a formaldehyde:phenol (F/P) mole ratio of 2.3:1, using 52% formaldehyde and 99% phenol. The reaction was carried out under basic conditions at elevated temperatures with 50% caustic solution. When the Ostwald viscosity of the resin reached 62cst (measured at 25° C.), the reaction was cooled and neutralized with 50% aqueous aromatic sulphonic acid. Urea was added as a formaldehyde scavenger at a level of 77% by mole of the residual formaldehyde. The resin was passed through a thin film evaporator to reduce the water content from about 30% to 4–8%. A 50/50 blend by mass of an ethylene oxide based nonionic surfactant Pluronic F127 from BASF and Harfoam PI from Huntsman Chemical Co. was then added in the molten state at 3.5% by weight of the resin and mixed into the resin to form a homogeneous mixture. The final viscosity of the resin was 9000–12000 cps (measured at 40° C.).

EXAMPLE 2

Preparation of Resol Foam

The resol foam was prepared by mixing together the resol resin and surfactant with the blowing agent and acid catalyst using a high shear short residence, rotor/stator continuous mixer. The blowing agent was saturated with nitrogen at 200 psi prior to introduction to the high shear mixer. The foaming catalyst was a blend of resorcinol, diethylene glycol, and a mixture of xylene and toluene sulphonic acids. (See U.S. Pat. Nos. 4,883,824 and 4,945,077). The resol resin, blowing agent, and catalyst were continuously metered to the mixer by means of suitable flow metering devices in the following ratios:

| | |
|---|---|
| resin/surfactant | 100 |
| HCFC141b | 8.63 |
| catalyst | 11.8 |

The foamable mixture (resin/surfactant, blowing agent, catalyst) exited the mixer through evenly spaced tubes and nozzles to form continuous beads of froth on a moving glass reinforced tissue facer. This resulted in parallel lines of foam which knitted together, as the froth expanded, to form a continuous sheet. The foam sheet then moved through a conveyor oven at approximately 80° C. at a fixed rate to produce a board that was cured enough to handle.

The resultant foam had a density of 3.7 pcf. The foam was left semi-cured and not post cured.

EXAMPLE 3

The foam sheet from Example 2 was slit ½" thick and then wrapped around a 10" inner mandrel and held in place by steel banding. This assembly was placed in an oven preheated to 70° C. and cured for 3 hours. The resultant foam remained in the shape of the inner mandrel.

EXAMPLE 4

A foam board, 1" thick, 1.5 pcf density and faced on both sides with spun-bond polyester mat was produced according to the method described in Examples 1 and 2. The sheet was kept at room temperature for one month. The foam sheet was then wrapped around a 3" diameter pipe and held in place with metal banding. The foamed sheet did not crack during this forming process. This assembly was placed in an oven preheated at 70° C. for 3 hours to cure. The foam maintained the shape of the pipe mandrel after curing.

We claim:

1. A process for producing a flexible, semi-cured, closed cell resol foam comprising the steps of:
    providing a foaming composition of
    (a) a phenol formaldehyde resol resin having substantially no free formaldehyde and having a water content of 4 to 8% and a viscosity ranging from 4,000 cps to 40,000 cps at 40° C.;
    (b) a blowing agent;
    (c) a surfactant; and
    (d) catalyst
    mixing the composition to initiate foaming and to produce a resol foam; and
    partially curing the resol foam such that it remains flexible enough to wrap around a shaped body.

2. A process according to claim 1 wherein the blowing agent is a hydrogenated chlorofluorocarbon (HCFC), hydrogenated fluorocarbon (HFC) or an alkane.

3. A process according to claim 1 wherein the HCFC is 1-chloro-1,1-difluoroethane, chlorodifluoromethane or a mixture thereof.

4. A process according to claim 1 wherein the perfluoralkane is represented by the formula:

wherein n is an integer ranging from 4 to 20, x is zero or an integer ranging from 2 to 10, and x+y=2n+2.

5. A process according to claim 1 wherein the perfluoroalkane is dodecafluoropentane.

6. A process for insulating a shaped body, including the steps of:
    wrapping the flexible, semi-cured closed cell resol foam of claim 1 around a shaped body; and
    fully curing the foam to a point where it retains its shape around the body.

7. A process according to claim 6 wherein the foam is pipe insulation and the shaped body is a pipe.

8. A process according to claim 6 where the insulation is removed from the shaped body after curing.

9. A process according to claim 6 wherein the foam composition is made from a phenol formaldehyde resol resin having substantially no free formaldehyde and have a water content of 4 to 8% and a viscosity ranging from 5,000 cps to 40,000 cps at 40° C., wherein the resulting foam composition is a closed cell resole foam.

10. A process according to claim 6 wherein the foam is fully cured to a density ranging from 0.5 to 3.0 pounds per cubic foot.

11. A process according to claim 6 wherein the fully cured foam is inflexible.

12. A process according to claim 6 wherein the shaped body is a waterheater storage tank and the foam is a waterheater insulator.

13. A process according to claim 6 where the foam naturally cures by the heat supplied by the shaped body in service.

14. A process according to claim 6 wherein the shaped body is an aircraft or submarine and the foam is an aircraft or submarine insulator.

* * * * *